O. L. ORVOLD.
MEASURING DEVICE.
APPLICATION FILED JULY 7, 1917.
1,271,486.
Patented July 2, 1918.
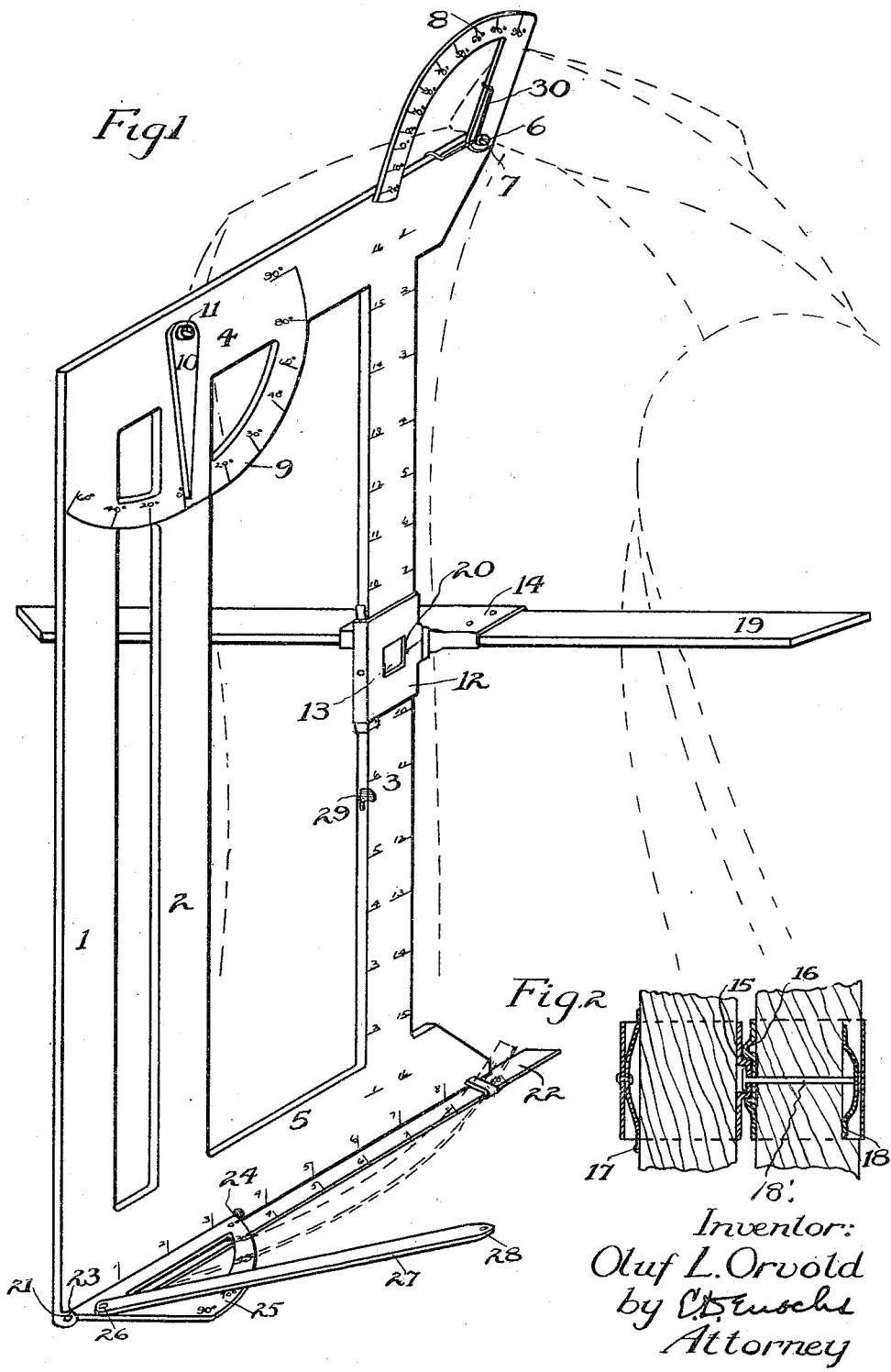
Inventor:
Oluf L. Orvold
by C. Busche
Attorney

UNITED STATES PATENT OFFICE.

OLUF L. ORVOLD, OF ST. PAUL, MINNESOTA, ASSIGNOR OF ONE-HALF TO FRANK E. BEWYER, OF MINNEAPOLIS, MINNESOTA.

MEASURING DEVICE.

1,271,486.

Specification of Letters Patent.

Patented July 2, 1918.

Application filed July 7, 1917. Serial No. 179,283.

*To all whom it may concern:*

Be it known that I, OLUF L. ORVOLD, a citizen of the United States, and a resident of St. Paul, in the county of Ramsey and State of Minnesota, have invented certain new and useful Improvements in Measuring Devices, of which the following is a specification.

One object of my invention is to provide in a measuring device means for measuring angles of a man's form from the vertical.

Another object of my invention is to provide means for measuring the angle between the slope of a person's neck and the slope of his back between the shoulders.

Another object of my invention is to provide means for measuring from the base of the neck to various points in the figure.

Another object of my invention is to provide means for measuring the length of a person's shoulders.

Another object of my invention is to provide means for measuring the forward or backward angle at which a person normally carries his shoulders.

With these and incidental objects in view the invention consists of certain novel features of construction and combination of parts, the essential elements of which are hereinafter described with reference to the drawing which accompanies and forms a part of this specification.

In the drawing Figure 1 is an isometric view of one embodiment of my improved measuring device applied to a man's body; Fig. 2 is an enlarged detail partly in section of a registering device between two hinged members.

I prefer to construct my measuring device of a substantially rectangular frame comprising vertical members 1, 2, and 3, and horizontal members 4 and 5.

The horizontal member 4 is carried forwardly to a point 6 and has hinged thereto at 7 an angle measuring device 8.

The frame also carries a quadrant 9 and both the quadrant 9 and the angle measuring device 8 are graduated preferably in degrees.

A pointer or pendulum 10, pivoted at 11, is arranged to hang vertically so as to indicate the number of degrees at which the device is inclined to the vertical.

The vertical member 3 has slidably mounted thereon a clamp 12 having an aperture 13 therein through which the indicating figures, preferably designating inches, marked on the member 3, may be read.

Rotatably carried by the clamp 12 is a second clamp 14, and looking at Fig. 2, a squared portion 15 is carried by the clamp 12 and registers with a socket 16 carried by the clamp 14, so that the clamp 14 may be turned to ninety degrees, that is, either horizontally or perpendicularly and locked in either position.

A spring 17 serves to hold the clamp 12 firmly in place, and a similar spring 18 engaged by the pin 18' with the squared portion 15 serves to allow the retraction of the clamp 14 for the purpose of turning it to register in either of its two positions.

A straight edge 19 is carried by the clamp 14 to be used both in measuring angles and distances of a person's form, and this straight edge 19 preferably registers with the indicating mark 20 carried by the clamp 12.

Hinged at 21 to the vertical member 1 is a flexible scale 22 preferably having indicating marks thereon, and this flexible scale may be swung about its hinged point and may be also flexed to conform to curves that are being measured.

Hinged at 23 and 24 is a quadrant 25 marked preferably in degrees, and pivoted at 26 is an indicating pointer 27 which coacts with the degrees on the quadrant 25.

This quadrant and pointer may be swung upwardly, the end of the pointer 28 registering with the locking recess 29 when not in use.

As indicating a few of the ways in which the device may be used, it can be applied to a person's form as shown with the point 6 registering about where the back collar button is located, and the straight edge 19 resting on the high portion of a man's back, under which conditions the pointer 10 will indicate the degrees from the vertical between the points being measured hence indicating the shape of the person's form.

At the same time the quadrant 8, which is normally pressed forward by the spring 30, will follow the angle of a person's neck and the difference between the angle indicated by the quadrant 8 and that shown by the pointer 10 will indicate the angle of a person's neck from the vertical.

The point where the flexible scale 22 is hinged at 21 may then be placed at the junction of the shoulder and neck, the scale 22 flexed so as to follow the contour of the party's shoulder and the length of the shoulder measured.

At the same time the quadrant 25 with its pointer 28 would be swung down and the pointer moved to correspond with the slope and forward bend of a man's shoulder, thus indicating the degree of the forward angle of the man's shoulder, as most people carry the point of the shoulder somewhat forward.

The device can be used in many other ways for measuring both angles and linear dimensions, and the description herein given is not intended to cover every use of the device, as many other uses can be made in the tailor art.

While I have described my invention and illustrated it in one particular design, I do not wish it understood that I limit myself to this construction, as it is evident that the application of my invention may be varied in many ways within the scope of the following claims.

I claim:

1. In a measuring device the combination of a frame, a forward extension at the top of said frame, a clamp slidably mounted on a frame member and carrying thereon, rotatably mounted, a straight edge, and means for locking said straight edge with respect to said frame member in either of two positions.

2. In a measuring device the combination of a frame, a forward extension at the top of said frame, a clamp slidably mounted on a frame member and carrying thereon, rotatably mounted, a straight edge, means for locking said straight edge with respect to said frame member in either of two positions, and a pendulum pivoted to said frame and adapted to indicate degree marks carried by said frame.

3. A measuring device comprising a frame, a quadrant hinged to the lower end of said frame, and an indicating pointer pivoted to said quadrant for indicating degrees.

4. In a measuring device the combination of a frame, an indicating pointer pivoted thereon to indicate degrees at which said frame is inclined, a quadrant hinged to said frame and adapted to assume a position at right angles thereto, and a pointer pivoted to said quadrant for indicating degrees marked on said quadrant.

5. In a measuring device the combination of a frame, a forward extension at the upper portion of said frame, a slidable straight edge carried by said frame and extending transversely thereof and having means for reading thereby linear dimensions carried by said frame.

6. In a measuring device the combination of a frame, a quadrant pivoted to the upper portion of said frame and having degree marks carried thereby, a slidable transversely mounted straight edge carried by said frame and having means for reading thereby linear dimensions carried by said frame.

7. In a measuring device the combination of a frame, a pointer pivoted to said frame, and a slidable straight edge carried by said frame and having indicating means thereon whereby linear dimensions carried by said frame may be read.

OLUF L. ORVOLD.

Copies of this patent may be obtained for five cents each, by addressing the "Commissioner of Patents, Washington, D. C."